US006557516B2

(12) United States Patent
Tsutsumikoshi

(10) Patent No.: US 6,557,516 B2
(45) Date of Patent: *May 6, 2003

(54) ENGINE UNIT FOR A VEHICLE

(75) Inventor: Shinobu Tsutsumikoshi, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/956,804

(22) Filed: Sep. 21, 2001

(65) Prior Publication Data

US 2002/0033162 A1 Mar. 21, 2002

(30) Foreign Application Priority Data

Sep. 21, 2000 (JP) .................................... 2000-287481

(51) Int. Cl.[7] .............................................. B62M 9/00
(52) U.S. Cl. ................................................ 123/196 R
(58) Field of Search .......................... 123/196 R, 198 R

(56) References Cited

U.S. PATENT DOCUMENTS 4,662,471 A * 5/1987 Kondo et al. ............... 180/226
5,101,924 A * 4/1992 Yamagiwa et al. ......... 180/220
5,263,549 A * 11/1993 Dick .......................... 180/226
5,391,124 A * 2/1995 Kasahara .................... 475/198
5,406,154 A * 4/1995 Kawaguchi et al. ........ 180/220
6,073,719 A * 6/2000 Ohmika et al. ............. 180/219
6,405,821 B2 * 6/2002 Tsutsumikoshi ............ 180/226

* cited by examiner

*Primary Examiner*—Marguerite McMahon
*Assistant Examiner*—Jason Benton
(74) *Attorney, Agent, or Firm*—Oblon, Spivak, McClelland, Maier & Neustadt, P.C.

(57) ABSTRACT

An engine unit for a vehicle comprises an engine case in which a crankshaft and a counter shaft are rotatably supported and an oil pump is provided so that rotation of the crankshaft is transmitted to the counter shaft. The counter shaft serves as a driving shaft of the oil pump arranged to be coaxial with the counter shaft. The oil pump has a pump case, which is provided with a tubular engaging member concentrically surrounding the counter shaft to extend in an axial direction thereof and with a discharge passage extending so as to be apart from the counter shaft in the axial direction thereof. The tubular engaging member is fitted into a fitting hole for a counter shaft bearing and the discharge passage having an end portion fitted into an oil supply port formed in the engine case.

8 Claims, 8 Drawing Sheets

ENGINE UNIT FOR A VEHICLE

BACKGROUND OF THE INVENTION

The present invention relates to an engine unit for a vehicle, which includes an oil pump for lubrication and is to be mounted on a scooter-type motorcycle.

In general, an engine unit to be mounted on a vehicle such as a motorcycle and an automobile has a structure in which a crankshaft is rotatably supported in the inside of an engine case (i.e., a crankcase) and an oil pump is bolted so that rotation of the crankshaft is transmitted to the oil pump at a reduced speed through reduction gears, a chain and the like.

Placement of the oil pump in the inside of the engine case however requires a working process to provide a mounting surface exclusively used for the oil pump in the inside of the engine case, leading to difficulty in manufacturing the engine case. In addition, there are required many parts such as bolts for fixing the oil pump, exclusive parts of reduction gear and the like, leading to an increased number of structural parts and resulting in an unavoidable increase in manufacturing cost of the engine unit.

SUMMARY OF THE INVENTION

An object of the present invention is therefore to eliminate defects or drawbacks encountered in the prior art mentioned above and to provide an engine unit of a vehicle, which permits not only easy manufacture of the engine case and reduction in number of structural parts to thereby achieve reduction in manufacturing cost of the engine unit, but also improvement in detachability of the oil pump as well as damping effect of a torsion damping device provided on the counter shaft.

The above and other objects can be achieved according to the present invention by providing an engine unit for a vehicle, comprising an engine case in which a crankshaft and a counter shaft are rotatably supported and an oil pump is provided so that rotation of the crankshaft is transmitted to the counter shaft at a reduced speed, wherein the counter shaft is arranged so as to serve as a driving shaft of the oil pump which is arranged coaxial with the counter shaft, the oil pump has a pump case, which is provided with a tubular engaging member concentrically surrounding the counter shaft to extend in an axial direction thereof and with a discharge passage extending so as to be apart from the counter shaft in the axial direction thereof, the tubular engaging member being fitted into a fitting hole for a counter shaft bearing, which is arranged on the engine case side, and the discharge passage having an end portion fitted into an oil supply port formed in the engine case.

In a preferred embodiment of the above aspect, the tubular engaging member has an outer diameter, which is equal to an outer diameter of the counter shaft bearing, which is fitted into the fitting hole.

The engine case is divided at a position of the fitting hole for the counter shaft bearing and a C-shaped ring is fitted between an outer peripheral surface of the tubular engaging member and an inner peripheral surface of the fitting hole for the counter shaft bearing so as to restrict movement of the oil pump in the axial direction.

The pump case is divided into one and another case bodies which are secured together by means of a plurality of bolts so as to provide a liquid tight structure, and the tubular engagement portion is integrally formed with one of the case bodies so as to coaxially surround the periphery of the counter shaft to extend rightward in the axial direction and the other one of the case bodies has a suction port and a discharge port, which surround the respective half peripheral portions of the counter shaft.

The counter shaft is provided with a shock absorbing mechanism for absorbing shock due to variation in torque, and the shock absorbing mechanism has an output side end to which the oil pump is provided.

The oil pump is a trochoid pump.

The vehicle is preferably of a scooter-type motorcycle.

The present invention may be referred to as a modified aspect of an engine unit for a vehicle, which comprises:

an engine case in which a crankshaft and a counter shaft are rotatably supported so that rotation of the crankshaft is transmitted to the counter shaft at a reduced speed; and an oil pump arranged coaxially with the counter shaft serving as a driving shaft of the oil pump, the oil pump having a pump case, which is provided with a tubular engaging member concentrically surrounding the counter shaft so as to extend in an axial direction thereof and a discharge passage extending so as to be apart from the counter shaft in the axial direction thereof, the tubular engaging member being fitted into a fitting hole formed to a counter shaft bearing supporting the counter shaft and being arranged on the engine case side, and the discharge passage having an end portion fitted into an oil supply port formed to the engine case.

According to such a structure, the tubular engaging member of the pump case is fitted into the fitting hole for the counter shaft bearing, which is originally formed on the engine case by a working process, so that the oil pump is held in the inside of the engine case. As a result, it become unnecessary to form an additional mounting surface for the oil pump on the engine case by a working process and prepare any bolts for fixing the oil pump and the like. A system in which the counter shaft directly drives the oil pump, makes the reduction gears and the like unnecessary.

Furthermore, it is possible to form the fitting holes for the counter shaft bearings as a hole having a constant inside diameter, leading to an easier working process of the engine case.

Moreover, the single C-shaped ring can surely restrict movement of the oil pump in the axial direction, resulting in a simplified structure. In addition, by putting the engine case in a separate state in the position of the fitting hole for the counter shaft bearing, it becomes possible to detach the oil pump from the engine case, thus improving detachability of the oil pump.

Still furthermore, it becomes possible to improve a damping effect of the shock absorbing mechanism through rotational resistance of the oil pump.

The nature and further characteristic features of the present invention will be made more clear from the description made with reference to the accompanying drawings.

BRIEF DESCRIPTION OF THE DRAWINGS

In the accompanying drawings:

FIG. 8 show an embodiment of the present invention, in which

DESCRIPTION OF THE PREFERRED EMBODIMENTS

Embodiments of the present invention will be described hereunder with reference to the accompanying drawings. Further, it is to be noted that the terms such as "right", "left", "upper", lower" or like are used herein in an illustrated state or standing attitude of a motorcycle of FIG. 1.

Figure 1:
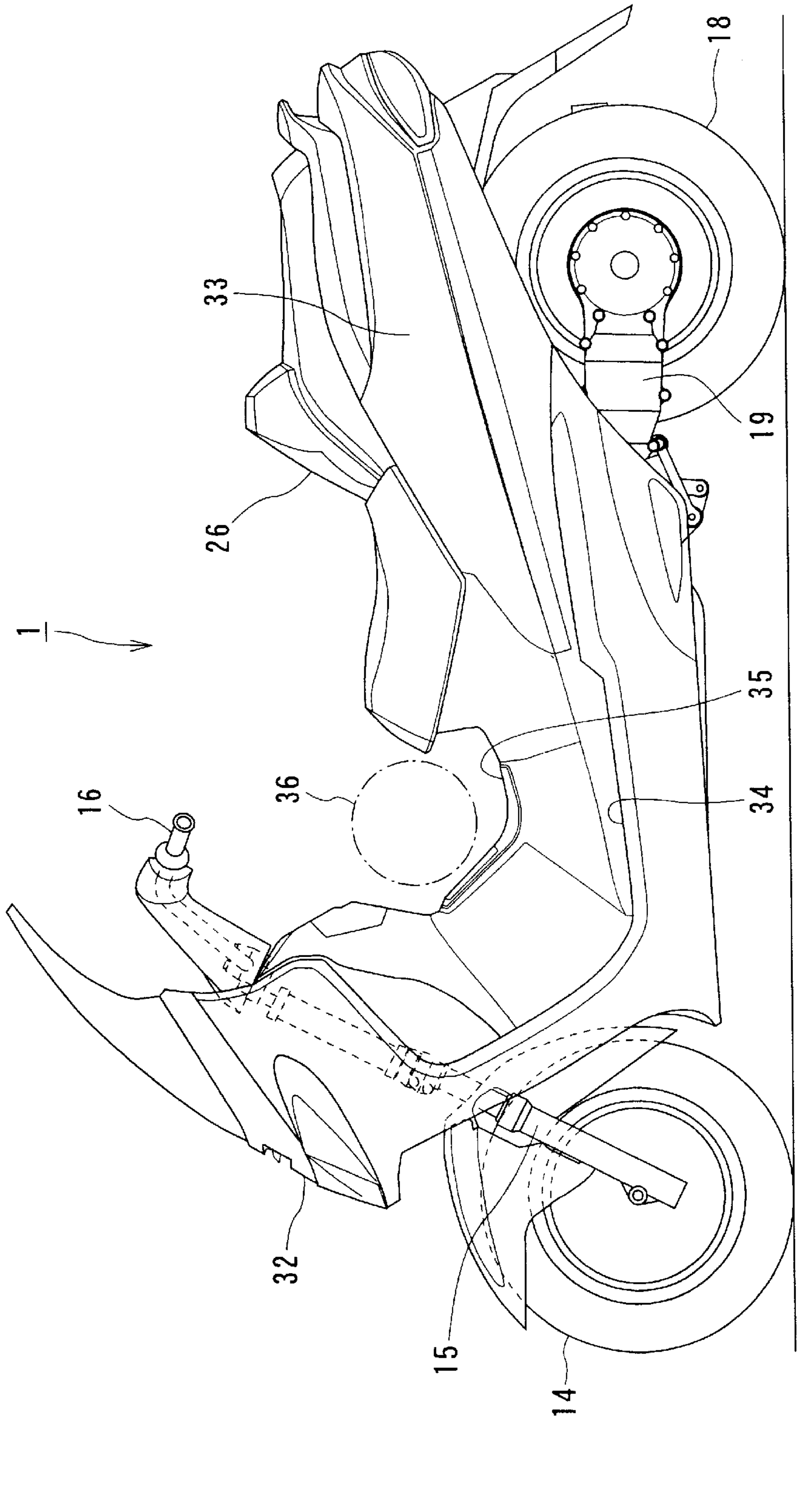
FIG. 1 is a left-hand side view illustrating an example of a scooter-type motorcycle according to the present invention.
Figure 2:
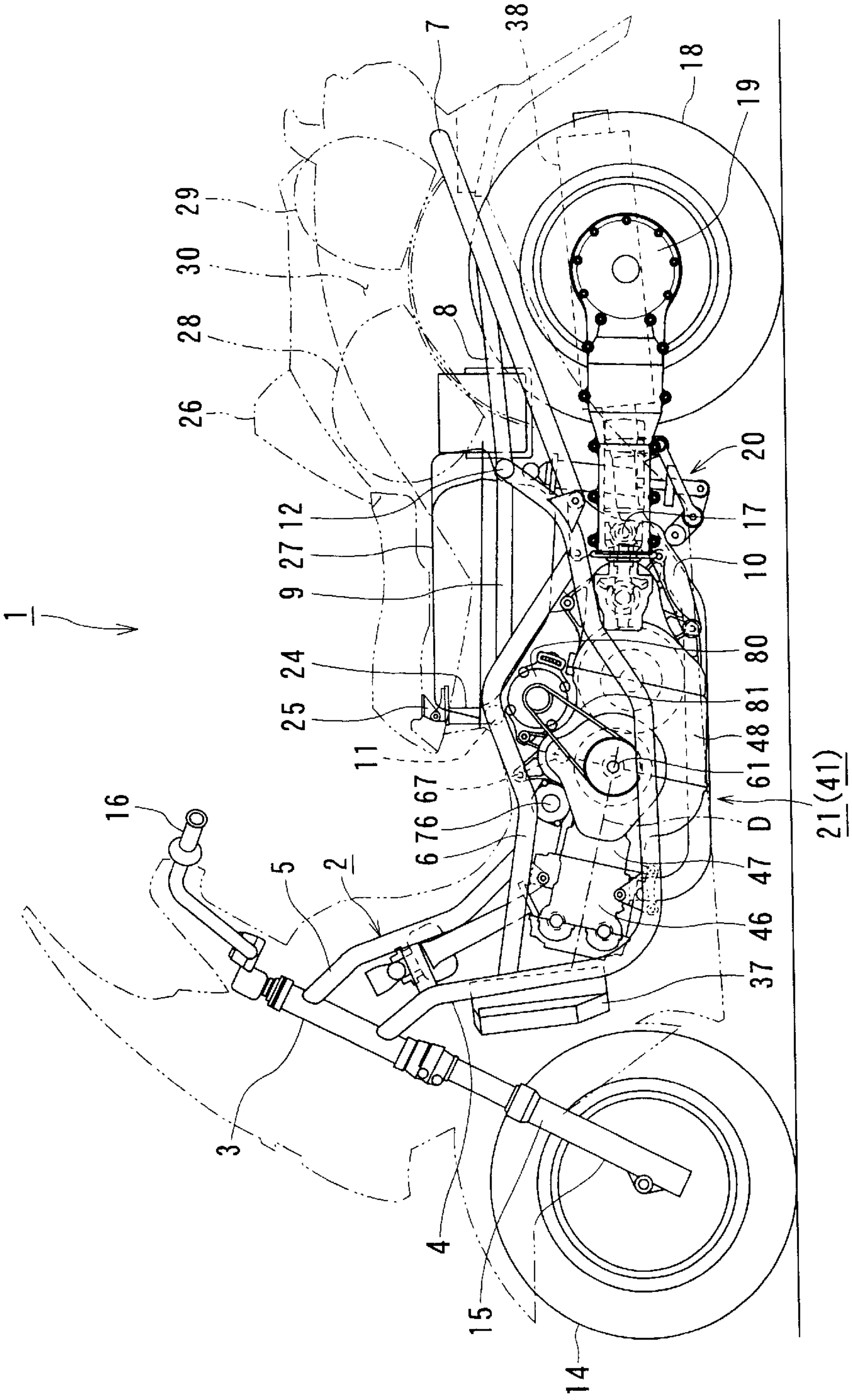
FIG. 2 is a left-hand side view illustrating the internal structure of the motorcycle.
Figure 3:
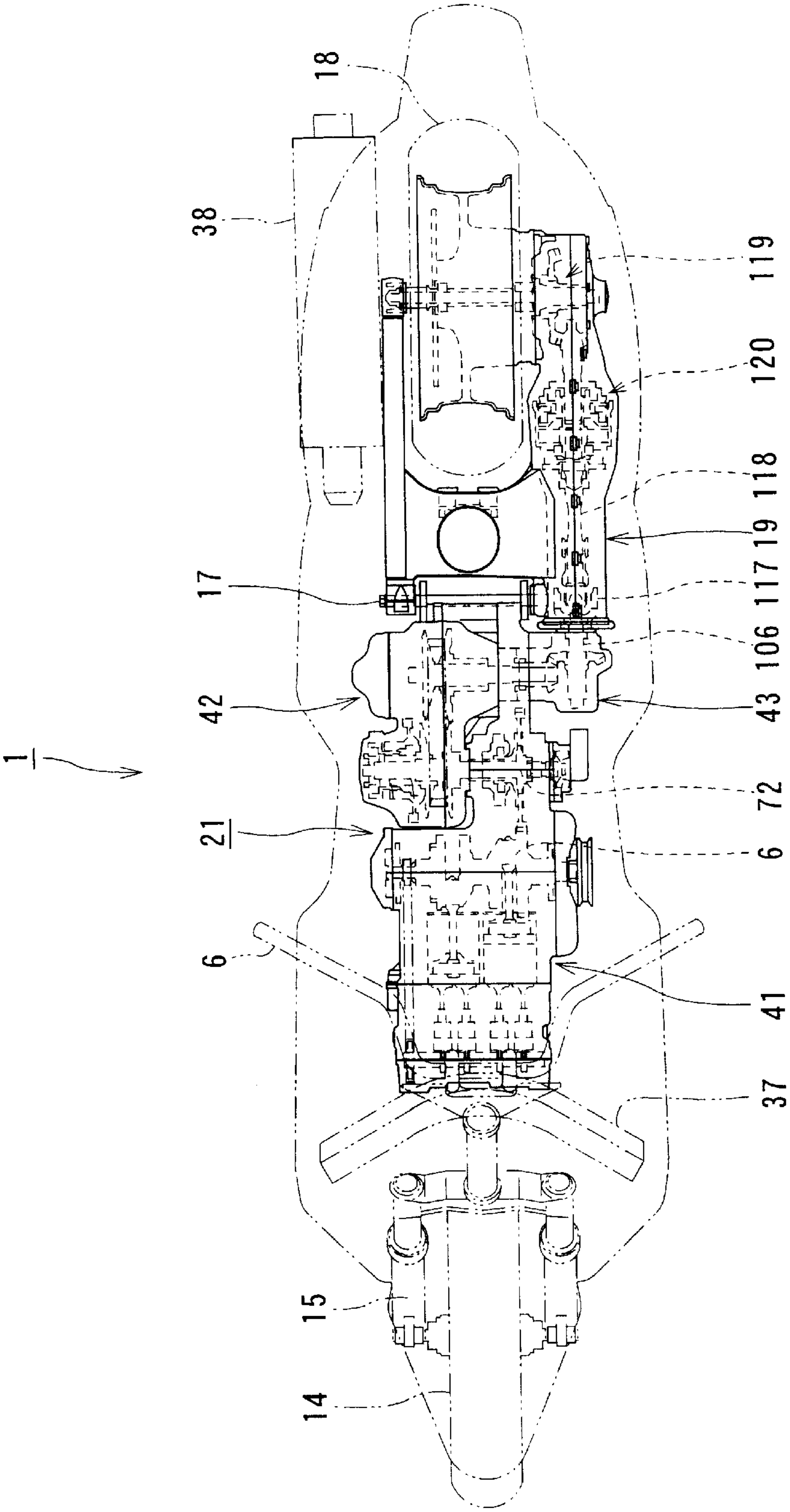
FIG. 3 is a plan view of the motorcycle.

With reference to FIGS. 1 to 3, the motorcycle 1 is provided with a body frame 2 made of steel. The body frame 2 is composed of a head pipe 3 placed on the front side of the body frame 2 and members extending rearward from the head pipe 3, that is, the members including: pairs of down pipes 4 and upper-pipes 5 and a pair of middle pipes 6; a rear-pipe 7 and a rear-stay 8, which are provided on the rear end portions of the down pipes 4 so as to extend continuously; a pair of seat pipes 9; and a pair of pivot plates 10 placed substantially in the central portion thereof, so as to form substantially an underbone structure. The pairs of pipe members (4, 5 and 6) are connected each other in the respective pairs by means of a plurality of cross members 11, 12 . . . and the others (not shown) extending in the width direction of the body.

The head-pipe 3 pivotably supports a front fork 15 for supporting a front wheel 14, together with a handle bar 16 and the other parts. In addition, a pivot shaft 17 extends between the pair of pivot plates 10. The pivot shaft 17 pivotably supports a swing transmission unit 19 for supporting a rear wheel 18 so that the swing transmission unit 19 is suspended by means of a suspension mechanism 20, attaining a shock absorbing effect. The down pipes 4, the middle pipes 6 and the pivot plates 10 suspend the power unit 21 so that the power of the power unit 21 is transmitted through the swing transmission unit 19 to the rear wheel 18.

The distance between the pair of middle pipes 6 is smaller than that between the pair of down pipes 4. The middle pipes 6 extend above the power unit 21 and the down pipes 4 extend in the vicinity of the opposite sides of the power unit 21. A seat stay 24 extending upward by a small distance from the cross member 11, which connects the middle portions of the pair of middle pipes 6 to each other, is provided at its upper end with a seat hinge 25 on which the front end of a rider's seat 26 is supported.

There are provided, below the rider's seat 26, a fuel tank 27 and an article accommodation chamber 30 capable of receiving helmets 28 and 29 so that operation of turning upward the rider's seat 26 around the seat hinge 25 permits to obtain access to the fuel tank 27 and the article accommodation chamber 30.

The body is entirely covered with a front cowling 32 and a frame cover 33, which are made of synthetic resin so as to provide a good-looking external appearance of the motorcycle 1 as well as protection of the internal parts. The frame cover 33 is integrally formed with a low floor type step board 34 (see FIG. 1), which is placed between the handle bar 16 and the rider's seat 26 and above the down pipes 4. A central console 35 is provided on the middle portion of the step board 34.

The pair of middle pipes 6 defining the body frame 2 pass through the central console 35. The engine unit 41, which forms the principal component of the power unit 21, is placed in a region between the inner portion of the central console 35 and the lower side of the rider's seat 26. The space on the upper side of the central console 35 forms a straddling space 36 when a rider gets on the motorcycle in a straddling state or gets off it. A radiator 37 for air-cooling the engine unit 41 is provided on the down pipes 4 so as to be placed immediately behind the front wheel 14. There is provided, on the right-hand side of the rear wheel 18, an exhaust muffler connected to a cylinder head 46 of the engine unit 41.

With reference to FIGS. 4 to 7, the power unit 21 is a composite body in which the engine unit 41, a transmission unit 42 and a bevel unit 43 are assembled together.

An engine case 44 for constituting the engine unit 41 is composed by combining a head cover 45, the cylinder head 46, a cylinder block 47, a crankcase 48 and a rear case 49 in this order from the front side to the rear side of the body. The rear case 49 is provided at its rear end integrally with a bracket member 51 having a rectangular plate-shape extending rearward. The bracket member 51 has a fitting hole 52 formed therein, which passes through the bracket member 51 in the width direction of the body.

Figure 4:
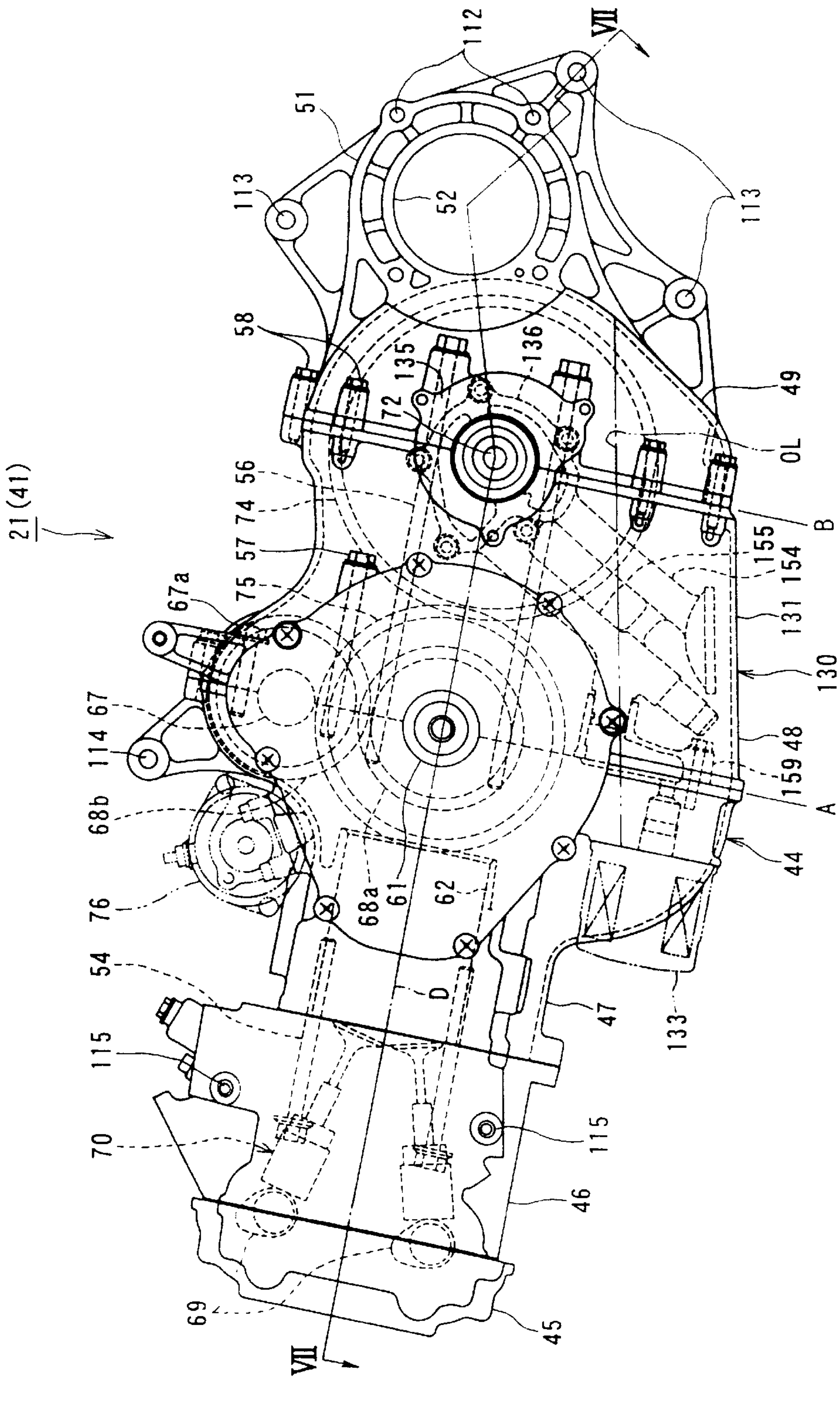
FIG. 4 is a left-hand side view of a power unit (i.e., an engine unit)
Figure 7:
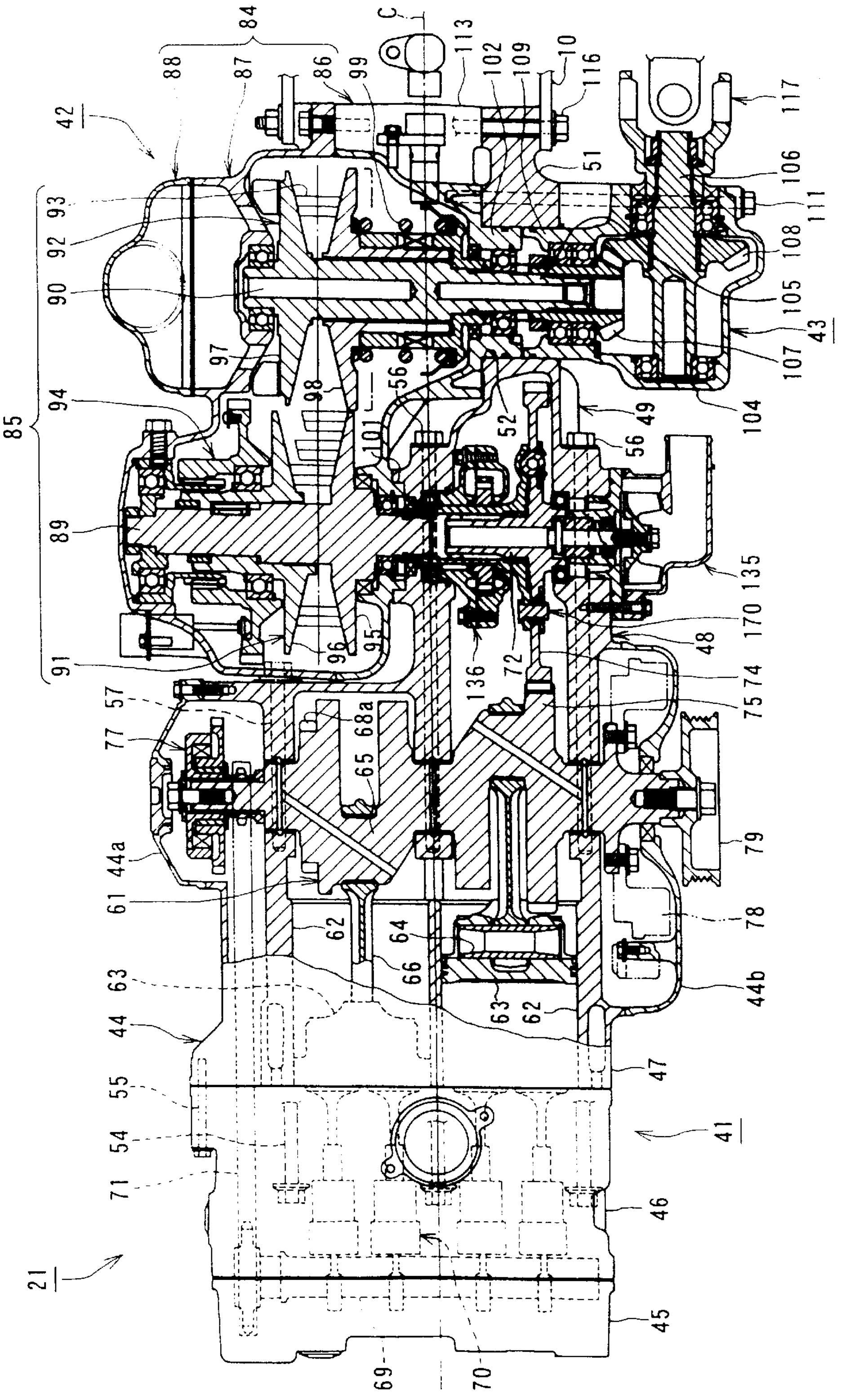
FIG. 7 is a cross-sectional view of the power unit cut along the line VII—VII of FIG. 4.

As shown in FIGS. 4 and 7, the cylinder head 46 is fixed to the cylinder block 47 by a fastening operation of six long fastening bolts 46 and a single short fastening bolt 55. In addition, the crankcase 48 and the rear case 49 are fixed to the cylinder block 47 by means of four through bolts 56 and a plurality of fastening bolts 57.

The through bolts 56, which are inserted from the side of the rear case 49, pass through the rear case 49 and the crankcase 48 so as to be fastened to the cylinder block 47. As a result, the rear case 49 and the crankcase 48 are also fastened to the cylinder block 47 by the through bolts 56. The fastening bolts 57, which have a length shorter than that of the through bolts 56, are inserted only into the crankcase 48 to be fastened to the cylinder block 47. The rear case 49 is fixed at its periphery to the crankcase 48 by means of a plurality of short fastening bolts 58.

A crankshaft 61 extending in the width direction of the motorcycle body is rotatably supported at a mating face "A" (see FIG. 4) between the cylinder block 47 and the crankcase 48. The cylinder block 47 is provided in its inside with a pair of cylinder bores 62. Each of the cylinder bores 62 has a central axis "D", which is placed substantially along the longitudinal direction of the body so that the front side of the central axis inclines upward, in a side view of the vehicle.

A piston 63 is inserted into each of the cylinder bores 62. A connection rod 66 connects a piston pin 64 of the piston 63 and a crank pin 65 with each other so that the sliding motion of the piston 63 in the cylinder bore 62 is converted into a rotational motion of the crankshaft 61 so as to provide an output of the engine unit 41.

A balance shaft 67 for countering the vibration of the engine is rotatably supported above the crankshaft 61. The balance shaft 67, which is also rotatably supported at the mating face "A" between the cylinder block 47 and the crankcase 48, is rotationally driven by the crankshaft 61 through gears 68*a* and 68*b* having the equal rotational speed. There is provided, above the cylinder block 47 and the crankcase 48, a balancer housing 67*a* for receiving the balance shaft 67.

The cylinder head 46 receives therein two cam shafts 69 and a valve gear 70. Each of the cam shafts 69 is driven by the crankshaft 61 through a timing chain 71 so as to operate the valve gear 70 at a predetermined constant timing to perform an air intake action or an exhaust action in the cylinder bores 62 (more specifically, combustion chambers thereof).

A counter shaft 72, which is in parallel with the crankshaft 61, is rotatably supported at a mating face "B" between the crankcase 48 and the rear case 49. The counter shaft 72, which has an extremely smaller axial length than the crankshaft 61. The rear portion of the crankcase 48 serving as the receiving member for the counter shaft 72, and the rear case 49 are placed so as to be biased (for example, towards the left-hand side) relative to the central line "C" of the body in the plan view (see FIG. 7) to form substantially an L-shape in the plan view of the engine unit 41 in cooperation with the bracket member 51 placed behind the rear case 49.

A counter-driven gear 74 provided on the left-hand side of the counter shaft 72 meshes with a counter-drive gear formed on a crank web of the left hand side of the crankshaft 61 so that the counter shaft 72 rotates in reverse in an interlocking movement to the crankshaft 61 rotating normally.

The right-hand portion of the crankshaft 61 is covered with a case cover 44*a* in which there is provided a one-way clutch mechanism 77 for receiving power from a starting motor 76 for starting the engine, as shown in FIG. 4. The left hand-side of the crankshaft 61 is covered with a case cover 44*b*. A flywheel 78 and a belt pulley 79 are provided inside and outside the case cover 44*b*, respectively, so as to be rotated together with the crankshaft 61 so that an alternator 80 (see FIG. 2) disposed above the engine unit 41 is driven by the belt pulley 79 through a belt 81.

As shown in FIGS. 2 and 4, auxiliary members (auxiliaries) of the engine unit 41 such as the starting motor 76 and the alternator 80 are disposed on the front and rear sides of the balancer shaft 67 (a balancer housing 67*a*) in a shared state, respectively. The starting motor 76 as the auxiliary member having a smaller diameter is disposed on the front side of the balancer shaft 67 (i.e., the balancer housing 67*a*) and the alternator 80 as the auxiliary member having a larger diameter is disposed on the rear side of the balancer shaft 67.

The auxiliaries such as the starting motor 76, the alternator 80 and the like are disposed on the front and rear sides of the balancer shaft 67, which is rotatably supported above the crankshaft 61, in a shared state. This arrangement ensures a good water proof performance of the auxiliary members. In general, the starting motor 76 has a diameter larger than the alternator 80. Accordingly, arrangement, in which the starting motor 76 is disposed on the front side of the balancer shaft 68 and the alternator 80 is disposed on the rear side of the balancer shaft 67, makes it possible to reduce the height of the central console 35 to thereby ensure a large straddling space 36.

The transmission unit 42 is constructed so that a belt drive-type transmission device 85 (for example, continuously variable transmission (CVT)) 85 is placed in a casing 84, which is separately formed from the engine unit 41. The casing 84 has a three-piece structure comprising an inner case 86, which is placed on the inner side in the width direction of the body, an outer case 87 for covering fluid-tightly the outside of the inner case 86 and a case cover 88 for covering the outside of the outer case 87.

The belt drive-type transmission device 85 comprises structural components, such as: a transmission input shaft 89 and a transmission output shaft 90 that are rotatably supported on the front and rear sides of a casing 84, respectively, so as to be in parallel with the crankshaft 61; an input V-belt pulley 91 and an output V-belt pulley 92 that are fitted on these shafts 89 and 90, respectively, so as to be rotatable together with them; a V-belt (or a metallic belt) 93 stretching between these pulleys 91 and 92; and a facing drive mechanism 94 provided so as to be coaxial with the input V-belt pulley 91.

The input V-belt pulley 91 has a stationary facing 95 formed integrally with the transmission input shaft 89 and a movable facing 96 provided so as to be movable in the axial direction. The facing drive mechanism 94 determines the position of the movable facing 96. The output V-belt pulley 92 also has a stationary facing 97 and a movable facing 98. The movable facing 98 is always urged resiliently against the side of the stationary facing 97 by means of a spring 99.

The input V-belt pulley 91 is disposed on the left-hand side of the transmission input shaft 89 and the output V-belt pulley 92 is disposed on the right-hand side of the transmission output shaft 90. The input V-belt pulley 91 and the output V-belt pulley 92 are disposed so as to align with each other in the longitudinal direction of the vehicle body. The facing drive mechanism 94 is disposed on the right-hand side of the input V-belt pulley 91. An air blowing device utilizing the case cover 88 is provided on the rear side of the facing drive mechanism 94 and the right-hand side of the output V-belt pulley 92.

The input V-belt pulley 91 and the output V-belt pulley 92 are aligned in the longitudinal direction, the facing drive mechanism 94 and the air blowing device are also aligned in the longitudinal direction and the transmission output shaft 90 is disposed so as to project from the output V-belt pulley 92 into the inside in the width direction of the vehicle body in this manner, with the result that the transmission unit 42 has substantially the L-shape in the plan view.

A bearing boss 101 provided on the front and left-hand side of the transmission unit 42 (the inner case 86) is tightly fitted into the right-hand surface of the connection portion between the crankcase 48 and the rear case 49 of the engine unit 41, and secured thereon. The transmission input shaft 89 passing through the bearing boss 101 is connected to the counter shaft 72 of the engine unit 41, for example, through a spline connection to be rotatable together with the counter shaft 72. The rear and left-hand side surface of the transmission unit 42 (86) is located closely to the right-hand surface (i.e., the surface existing on the central line "C" of the vehicle body) of the bracket member 51 of the engine unit 41. A bearing boss 102 for the transmission output shaft 90 is tightly fitted into the fitting hole 52 of the bracket member 51.

Each of the engine unit 41 and the transmission unit 42 has substantially the L-shape in the plan view. However, the combination of these units 41 and 42 having substantially the L-shape provides substantially a rectangular shape.

The bevel unit 43 has a structure in which a bevel input shaft 105 disposed along the width direction of the vehicle body and a bevel output shaft 106 disposed along the longitudinal direction thereof are rotatably supported in the inside of an independent casing 104, and an input bevel gear 107 is provided on the bevel input shaft 105 so as to be rotatable together with the bevel input shaft 105 and an output bevel gear 108 meshing with the above-mentioned input bevel gear 107 is provided on the bevel output shaft 106 so as to be rotatable together with the bevel output shaft 106.

The bevel unit 43 is disposed on the left-hand side surface (i.e., the opposite surface to the central line "C" of the vehicle body) of the bracket member 51 of the engine unit 41 so as to be located closely to the bracket member 51. A bearing boss 109 for the bevel input shaft 105 is tightly fitted into the fitting hole 52 of the bracket member 51, and secured thereon. The transmission output shaft 90 is connected to the bevel input shaft 105, for example, through a spline connection to be rotatable together with the bevel input shaft 105.

Fastening members such as through bolts 111 or the like pass from the left-hand side through the bevel unit 43 and the bracket member 51 so as to be fastened to the transmission unit 42 as shown in FIG. 7. The through bolts 111 fasten the bevel unit 43 and the bracket member 51 onto the transmission unit 42. Totally, four through bolts 111 are located and pass through through-holes 112 formed at an equal interval on the peripheral portion defining the fitting hole 52 of the bracket member 51, as shown in FIG. 4.

The bracket member 51 is provided on its peripheral portions with, for example, three frame-fixing portions 113. These frame-fixing portions 113, a frame-fixing portion 114 provided on the cylinder block 47 as shown in FIG. 4 and two frame-fixing portions 115 provided on the cylinder head 46 are fixed to fixing portions, which are provided on the down pipes 4 and the middle pipes 6 of the body frame 2, as well as the pivot plate 10, (see FIG. 7), by means of fastening bolts 115 fastened so that the power unit 21 is entirely mounted on the body frame 2.

In the power unit 21, rotation of the crankshaft 1 of the engine unit 41 is transmitted to the counter shaft 72 through the counter drive gear 75 and the counter driven gear 74. Rotation of the counter shaft 72 is transmitted directly to the transmission input shaft 89 of the transmission unit 42. Rotation of the transmission input shaft 89 is transmitted to the transmission output shaft 90 through the input V-belt pulley 91, the V-belt 93 and the V-belt pulley 92. Rotation of the transmission output shaft 90 is transmitted to the bevel output shaft 106 through the bevel input shaft 105 and the input bevel gear 107 of the bevel unit 43 and the output bevel gear 108, with the result that the engine output is transmitted rearward through the bevel output shaft 106.

The number of gear tooth of the counter drive gear 75 is smaller than that of the counter driven gear 74 so that rotation of the crankshaft 61 is transmitted to the counter shaft 72 at a reduced speed, thus achieving a primary reduction in speed. The number of gear tooth of the input bevel gear 107 is smaller than that of the output bevel gear 108 so as to achieve a secondary reduction in speed.

Figure 5:
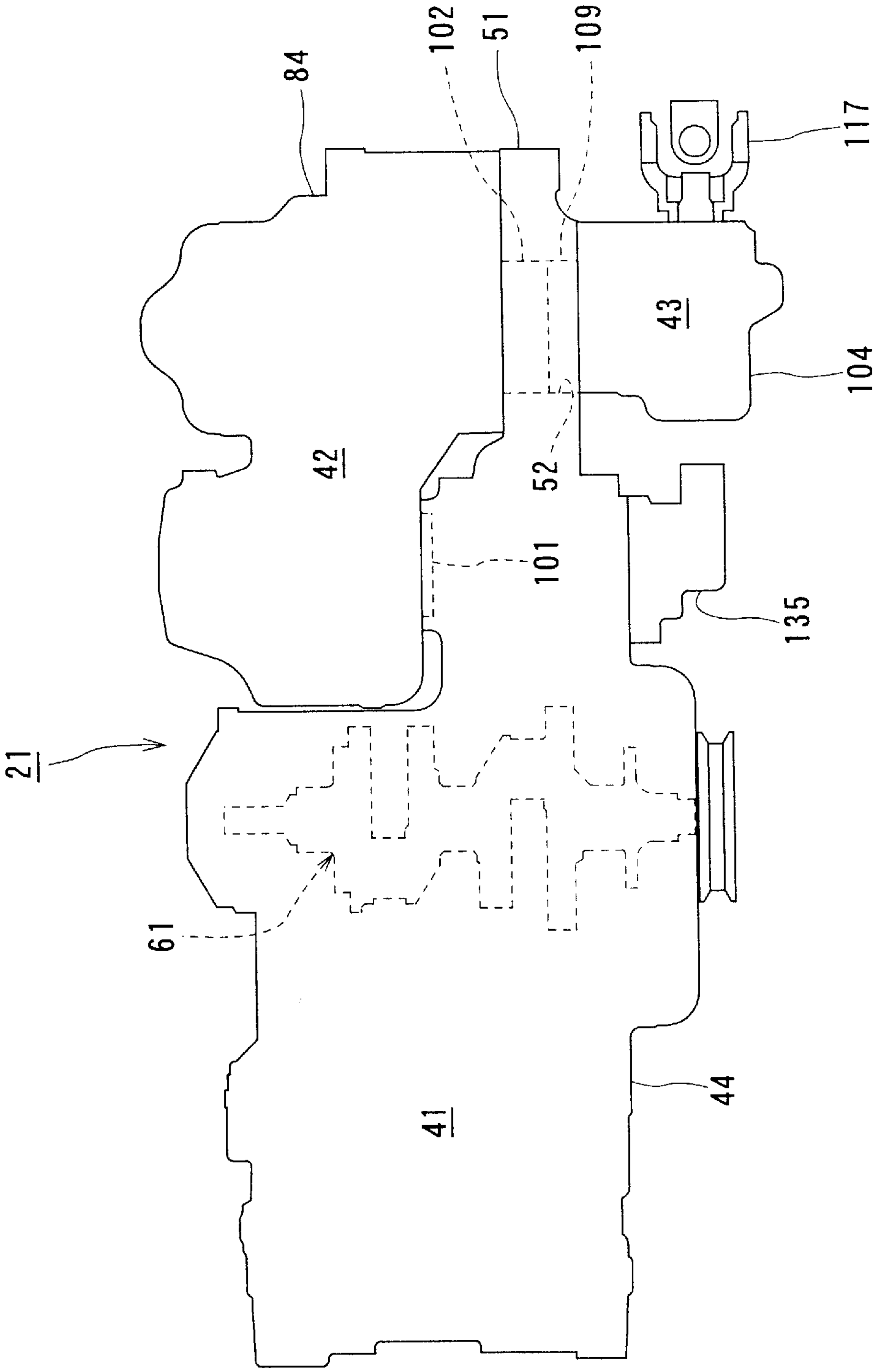
FIG. 5 is a schematic plan view of the power unit.
Figure 6:
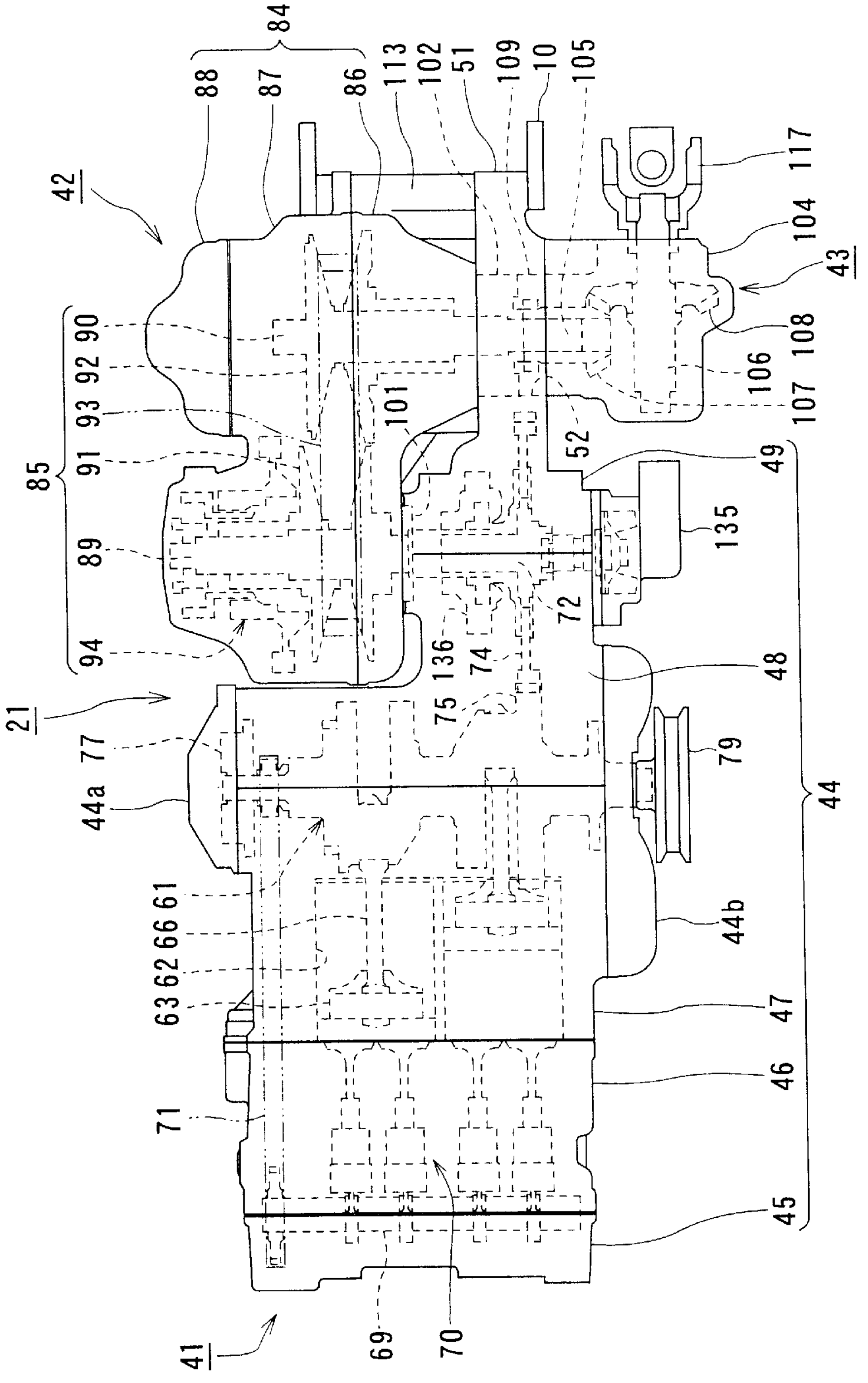
FIG. 6 is a plan view of the power unit.

Rotation of the bevel output shaft 106 is transmitted to the drive shaft 118, which is rotatably supported in the swing transmission unit 19, through a universal joint 117 (see FIGS. 3, 5 and 6). Then, rotation of the drive shaft 118 is transmitted to the rear wheel 18 through a rear bevel gear mechanism 119. A starting clutch, for example, an electromagnetic type starting clutch 120 is provided in the middle of the drive shaft 118 so that on-off operation of the starting clutch 120 makes it possible to intermittently transmit the power of the engine unit 41 to the rear wheel 18. The facing drive mechanism 94 of the belt drive-type transmission device 85 in the transmission unit 42 moves the movable facing 96 of the input V-belt pulley 91 in the axial direction under the power of an actuator controlled by a control device (not shown) in accordance with a cruising speed, a throttle opening, an engine load and other conditions of the motorcycle 1.

When starting the motorcycle 1, for example, the facing drive mechanism 84 moves the movable facing 96 away from the stationary facing 95 so as to provide the smallest effective diameter of the input V-belt pulley 91, on which the V-belt is stretched. Accordingly, the movable facing 98 is urged against the side of the stationary facing 97 under the resilient force given by the spring 99 on the side of the output V-belt pulley 92 so as to provide the maximum effective diameter of the output V-belt pulley 92, on which the V-belt is stretched, leading to a high transmission ratio and facilitating the starting operation.

During an acceleration operation of the motorcycle 1, the facing drive mechanism 94 gradually puts the movable facing 96 of the input V-belt pulley 91 towards the stationary facing 95 to thereby increase the effective diameter of the input V-belt pulley 91, on which the V-belt is stretched. As a result, the movable facing 98 moves away from the stationary facing 97 against the resilient force of the spring 99 on the side of the output V-belt pulley 92 to decrease the effective diameter of the input V-belt pulley 91, leading to a low transmission ratio and an increased speed of the motorcycle.

The rear half portion of the cylinder block 48 and the lower portions of the crankcase 48 and the rear case 49 are placed in a lower position than the lower surface of the cylinder head 46 and the front half portion of the cylinder block 47. The portion existing in such a lower portion serving as an oil-reservoir 130 in which engine oil is reserved at a level of oil level "OL". The oil-reservoir 130 has a flat-shaped bottom 131, which is substantially in parallel with a road surface, while the cylinder bore 82 has the central axis "D" having the front end being located higher than the rear end thereof.

An oil filter 133 is exchangeably provided on the front side of the oil-reservoir 130, below the balancer shaft 67 and the cylinder bore 62 and above the bottom 131 of the oil-reservoir 130. Placement of the oil filter 133 in such a position makes it possible to improve detachability of the oil filter 133 and prevent engine oil dropping when detaching the oil filter 133 from making the engine unit 41 and its surroundings dirty.

A water pump 135 for circulating cooling water is arranged so as to be coaxial with the left-hand end of the counter shaft 72 on the left-hand side surface of the connection portion between the crankcase 48 and the rear case 49 of the engine unit 41. In addition, an oil pump 136 for supplying engine oil is provided to be coaxial with the right-hand end of the counter shaft 72 in the inside of the connection portion between the crankcase 48 and the rear case 49. These pumps 135 and 136 are driven directly by the counter shaft 72.

Figure 8A:
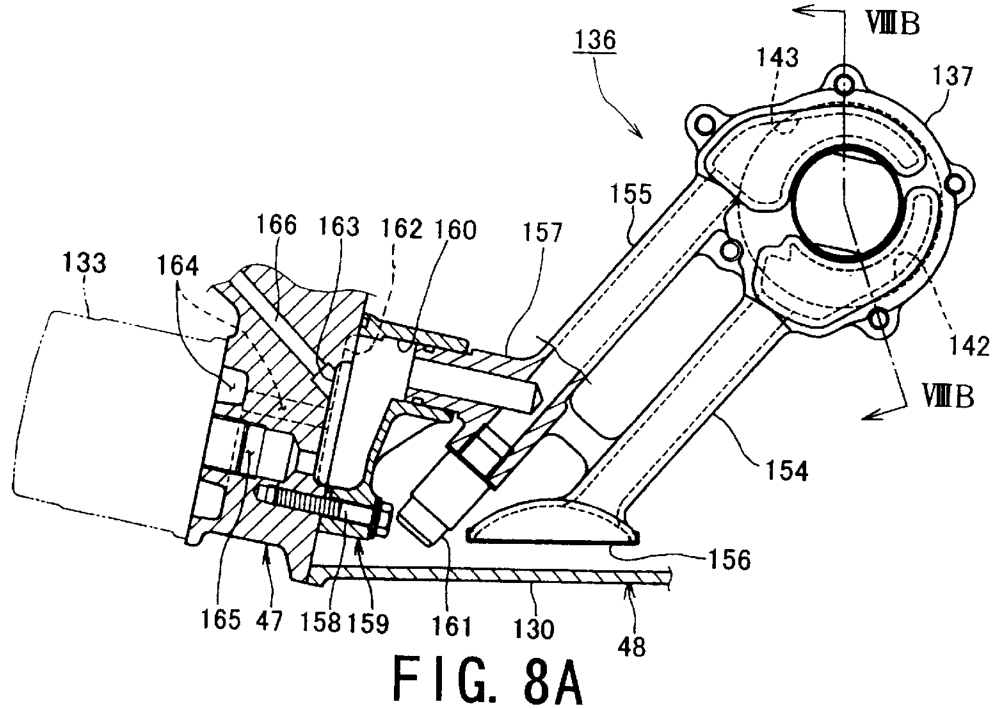
FIG. 8A is an enlarged left-hand side view of the oil pump and its surroundings.
Figure 8B:
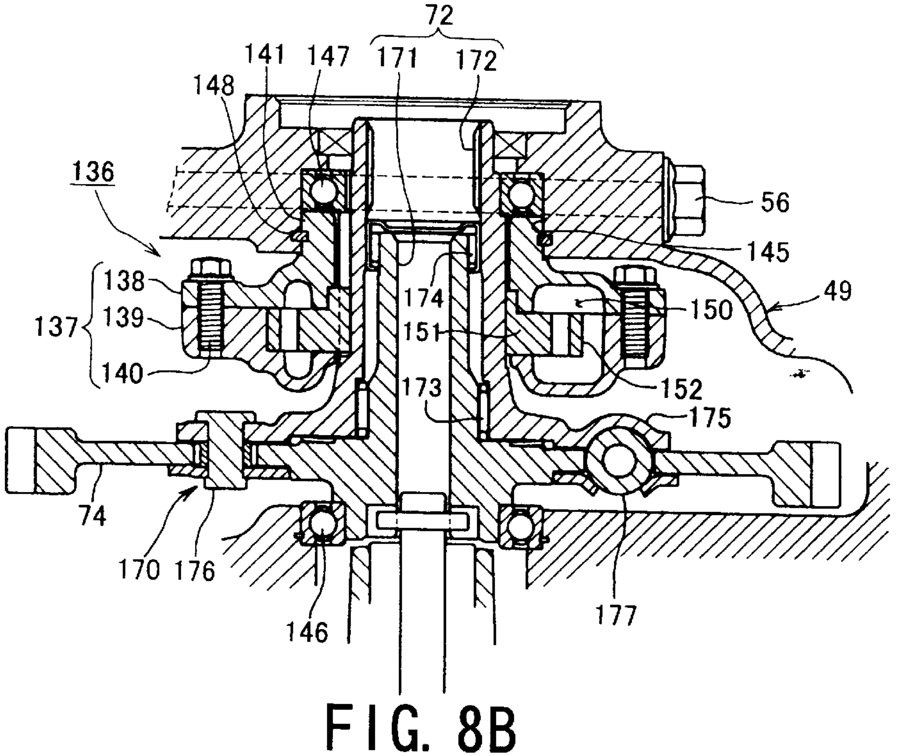
FIG. 8B is an enlarged cross sectional view of the oil pump and its surroundings cut along the line VIIIB—VIIIB in FIG. 8A.

FIGS. 8A and 8B are enlarged left-hand side view and cross sectional view of the oil pump 136 and its surroundings, respectively. The oil pump 136, which is, for example, of a trochoid type, has a pump case 137, in which a left-hand side case cover 139 is fixed to a right-hand side case body 138 by a plurality of bolts 140 so as to provide a liquid tight structure. The case body 138 has a tubular engagement portion 141, which is integrally formed with the case body 138 and surrounds coaxially the periphery of the counter shaft 72 so as to extend rightward in the axial direction. The case cover 139 has a suction port 142 and a discharge port 143, which surround the respective half peripheral portions of the counter shaft 72.

The tubular engagement portion 141 of the case body 138 is closely fitted into a fitting hole 145 for the counter shaft, which is provided on the mating face "B" (see FIG. 4) between the crankcase 44 and the rear case 49 of the engine case 44. Among a pair of counter shaft bearings 146 and 147, the right-hand counter shaft bearing 147 is fitted into the inside (i.e., the right-hand side) of the fitting hole 145 for the counter shaft. The tubular engagement portion 141 is fitted forward (i.e., the left-hand side) the-right-hand counter shaft bearing 147.

A working process is carried out so that the outer diameter of the tubular engagement portion 141 is equal to that of the counter shaft bearing 147. Accordingly, the fitting hole 145 for the counter shaft is formed into a hole having a constant radius so as to provide a smooth inner surface. A C-shaped ring is fitted between the outer peripheral surface of the tubular engagement portion 141 and the inner peripheral surface of the fitting hole 145 for the counter shaft so as to restrict the movement of the oil pump 136 in the axial direction.

An inner rotor 151 and an outer rotor 152 are disposed in a pump chamber 150 formed in the pump case 137. The inner rotor 151 is secured on the counter shaft 72 so as to be rotatable together with the counter shaft 72. The outer rotor 152 is provided eccentrically on the periphery of the inner rotor 151. The external tooth formed on the outer periphery of the inner rotor 151 mesh with the internal tooth formed on the inner periphery of the outer rotor 152 so that the engine oil is supplied from the suction port 142 towards the exhaust port 143.

A tubular suction passage 154 and a tubular discharge passage 155 extend in parallel to each other, for example, obliquely downward and forward from the suction port 142 and the discharge port 143 of the case cover 139, respectively, so as to be apart from the counter shaft 72. An oil strainer 156 provided at the tip end of the suction passage 154 reaches a position in the vicinity of the bottom of the oil-reservoir 130. A connection pipe 157, which branches off from the distal end of the discharge passage 155, or the middle portion of the discharge passage 155 to extend substantially horizontally and forward, is fitted liquid-tightly into an oil supply port 160 of an oil passage block 159, which is fixed on the rear side of the oil filter 133 by bolts 158 in the inside of the cylinder block 47. Such a structure restricts rotation of the whole oil pump 136 around the counter shaft 72. The discharge passage 155 is provided at its end with a relief valve 161.

The cylinder block 47 is provided with an oil supply passage 162 aligned with the oil supply port 160 of the oil passage block 159, and an oil supply passage 163 placed in the vicinity (i.e., the left-hand side) of the oil supply passage 162. The oil supply passage 162 communicates with an inlet passage 164 of the oil filter 133. The oil supply passage 163 communicates with an outlet passage 164 of the oil filter 133 and a gallery passage 166 connected to a main gallery (not shown). The oil passage block 159 may be formed integrally with the inside of the cylinder block 47.

The counter shaft 72 is provided with a shock absorbing mechanism 170 for absorbing shock due to variation in torque. The counter shaft 72 has a dual structure in which a tubular outer shaft 172 serving as the output shaft is provided around the outer periphery of an inner shaft 171, serving as the input shaft, through bearings 173 and 174 so as to be coaxial with the inner shaft 171 and make a relative movement thereto. The inner shaft 171 is supported at its left-hand end on the counter shaft bearing 146, and the outer shaft 172 is supported at its right-hand end on the counter shaft bearing 147.

The above-mentioned counter driven gear 74 is disposed on the side of the inner shaft 171 so as to be rotatable together with the inner shaft 171. A damper plate 175 having a disk-shape is disposed on the side of the outer shaft 172 so as to abut against the right-hand side of the counter driven gear 74 and to be rotatable together with the outer shaft 172. The counter driven gear 74 and the damper plate 175 are connected with each other by means of a plurality of damper pins 176 and damper springs 177, thus constituting the shock absorbing mechanism 170.

Compression of the damper spring 177 permits a slight torsion between the counter driven gear 74 (i.e., the inner shaft 171) and the damper plate 175 (i.e., the outer shaft 172) so that the shock absorbing mechanism 170 absorbs shock due to variation in torque of the crankshaft 61 during the operation of the engine unit 41. The inner rotor 151 of the oil pump 136 is capable of rotating together with the outer shaft 172 serving as the output side of the counter shaft 72 (i.e., the shock absorbing mechanism 170).

Operation of the engine unit 41 to drive the oil pump 136 by the counter shaft 72 causes engine oil reserved in the oil reservoir 130 to flow through the oil strainer 156, the suction passage 154, the suction port 142, the discharge port 143, the discharge passage 155, the connection pipe 157, the oil supply port 160, the oil supply passage 162, the inlet passage 164, the oil filter 133, the outlet passage 165, the oil supply passage 163, the gallery passage 166 and the main gallery in this order to be supplied into the respective lubrication portions, and then return to the oil reservoir 130. When the discharge pressure of the oil pump 136 exceeds the required prescribed value, the relief valve 161 opens so that part of oil returns to the oil reservoir 130, thus adjusting the oil pressure to an appropriate value.

As described above, the engine unit 41 has a structure in which the oil pump 136 is disposed to be coaxial with the counter shaft 72, the tubular engagement portion 141 arranged on the pump case 137 of the oil pump is fitted into the fitting hole 145 for the counter shaft, which is originally formed on the engine case 44, and the distal end of the discharge passage 155 (i.e., the connection pipe 157) extending from the oil pump 136 is fitted into the oil supply port 160 provided in the inside of the engine case 44 (i.e., the oil passage block 159).

It is therefore possible to provide a stable installation of the oil pump 136 without forming an additional mounting surface exclusively used for the oil pump 136 in the engine case 44 or preparing any bolts for fixing the oil pump 136. In addition, the counter shaft 72 to which rotation of the crankshaft 61 is transmitted at a reduced speed, directly drive the oil pump 136, thus making any reduction gear and the like unnecessary. As a result, it is possible to achieve an easy manufacture of the engine case 44 and reduce the number of structural parts so as to realize reduction in manufacturing cost of the engine unit 41.

The structure in which the outer diameter of the counter shaft bearing 147 that is fitted into the fitting hole 145 for the counter shaft is equal to the outer diameter of the tubular engagement portion 141 of the oil pump 136, makes it possible to form the fitting hole 145 for the counter shaft into a hole having a constant radius so as to provide a smooth inner surface, thus leading to an easy working of the engine case 44.

The structure in which the crankcase 48 and the rear case 49 that forms the engine case 44 is divided in a position of the counter shaft 72 (i.e., the fitting hole 145 for the counter shaft) and the C-shaped ring is fitted between the outer peripheral surface of the tubular engagement portion 141 of the oil pump 136 and the inner peripheral surface of the fitting hole 145 for the counter shaft so as to restrict the movement of the oil pump 136 in the axial direction, makes it possible to surely restrict movement of the oil pump 136 in the axial direction by the single C-shaped ring 148, resulting in a simplified structure. In addition, division of the crankcase 48 and the rear case 49 permits an easy detachment of the oil pump 136, thus improving detachability of the oil pump 136.

In addition, the structure in which the inner rotor 151 of the oil pump 136 is rotatable together with the outer shaft 172 serving as the output side of the shock absorbing mechanism 170, which is provided on the counter shaft 72, permits improvement in damping effect of the shock absorbing mechanism through rotational resistance of the oil pump 136.

In a case where the bracket member 51 extending rearward is integrally formed with the rear side of the rear case 49 and the transmission unit 42 and the bevel unit 43 are combined with the bracket member 51, as in the engine unit 41, it is necessary to maintain a long distance between the through bolts 56 for fixing the rear case 49 to the crankcase 48 in the width direction in order to ensure a high rigidity of the bracket member 51, with the result that the inside width of the rear case 49 may inevitably be extended, generating a useless dead space. Placement of the oil pump 136 in such dead space permits an effective use of such a space, thus contributing to the realization of a small-sized engine unit 41.

The subject matter of the present invention is not limited only to the above-described embodiments. The present invention may be applied not only to the engine unit for the scooter-type motorcycle, but also to an engine unit for the other type of motorcycle, an automobile, a marine vessel and the like. The present invention may be modified so that the oil pump is provided coaxially on a rotation shaft (i.e., a camshaft or the like) other than the counter shaft to which rotation of the crankshaft is transmitted at a reduced speed, while adopting the same securing structure as mentioned above.

What is claimed is:

1. An engine unit for a vehicle, comprising an engine case in which a crankshaft and a counter shaft are rotatably supported and an oil pump is provided so that rotation of the crankshaft is transmitted to the counter shaft at a reduced speed, wherein said counter shaft is arranged so as to serve as a driving shaft of the oil pump which is arranged coaxial with the counter shaft, said oil pump has a pump case, which is provided with a tubular engaging member concentrically surrounding the counter shaft so as to extend in an axial direction thereof and with a discharge passage extending so as to be apart from the counter shaft in the axial direction thereof, said tubular engaging member being fitted into a fitting hole for a counter shaft bearing, which is arranged on the engine case side, and said discharge passage having an end portion fitted into an oil supply port formed in the engine case.

2. An engine unit for a vehicle according to claim 1, wherein said tubular engaging member has an outer diameter substantially equal to an outer diameter of the counter shaft bearing, which is fitted into said fitting hole.

3. An engine unit for a vehicle according to claim 1, wherein said engine case is divided at a position of said fitting hole for the counter shaft bearing and a C-shaped ring is fitted between an outer peripheral surface of the tubular engaging member and an inner peripheral surface of said fitting hole for the counter shaft bearing so as to restrict movement of said oil pump in the axial direction.

4. An engine unit for a vehicle according to claim 3, wherein said pump case is divided into one and another case bodies which are secured together by means of a plurality of bolts so as to provide a liquid tight structure, and said tubular engagement portion is integrally formed with one of said case bodies so as to coaxially surround the periphery of the counter shaft so as to extend in the axial direction and the other one of the case bodies has a suction port and a discharge port, which surround the respective half peripheral portions of the counter shaft.

5. An engine unit for a vehicle according to claim 1, wherein said counter shaft is provided with a shock absorbing mechanism for absorbing shock due to variation in torque, and the shock absorbing mechanism has an output side end to which the oil pump is provided.

6. An engine unit for a vehicle according to claim 1, wherein said oil pump is a trochoid pump.

7. An engine unit for a vehicle according to claim 1, wherein the vehicle is a scooter-type motorcycle.

8. An engine unit for a vehicle, comprising:

an engine case in which a crankshaft and a counter shaft are rotatably supported so that rotation of the crankshaft is transmitted to the counter shaft at a reduced speed; and an oil pump arranged coaxially with the counter shaft serving as a driving shaft of the oil pump, said oil pump having a pump case, which is provided with a tubular engaging member concentrically surrounding the counter shaft so as to extend in an axial direction thereof and a discharge passage extending so as to be apart from the counter shaft in the axial direction thereof, said tubular engaging member being fitted into a fitting hole formed to a counter shaft bearing supporting the counter shaft and being arranged on the engine case side, and said discharge passage having an end portion fitted into an oil supply port formed to the engine case.

* * * * *